United States Patent [19]
Mellon

[11] Patent Number: 6,089,416
[45] Date of Patent: Jul. 18, 2000

[54] INTEGRATED MEASURING SYSTEM PACKAGE

[75] Inventor: Mark Mellon, Midlothian, Va.

[73] Assignee: Westvaco Corporation, New York, N.Y.

[21] Appl. No.: 09/240,813

[22] Filed: Feb. 1, 1999

[51] Int. Cl.⁷ .................................................. G01F 11/26
[52] U.S. Cl. ............................................................ 222/456
[58] Field of Search ..................................... 222/456, 454

[56] References Cited

U.S. PATENT DOCUMENTS

| | | |
|---|---|---|
| 2,205,129 | 6/1940 | Barnett . |
| 2,335,363 | 11/1943 | Shelton .................................. 222/456 |
| 3,043,481 | 7/1962 | Johansen ................................ 222/456 |
| 3,187,961 | 6/1965 | Moore . |
| 3,289,885 | 12/1966 | Villaveces . |
| 3,487,985 | 1/1970 | Spangler . |
| 3,921,862 | 11/1975 | Holmstrom . |
| 4,117,956 | 10/1978 | von Schuckmann . |
| 4,138,041 | 2/1979 | Capo et al. .............................. 222/456 |
| 4,261,483 | 4/1981 | Dutcher . |
| 4,522,313 | 6/1985 | Jennings et al. . |
| 4,564,125 | 1/1986 | Esslinger . |
| 4,723,531 | 2/1988 | Hampton . |
| 5,100,021 | 3/1992 | Mussi et al. . |
| 5,169,059 | 12/1992 | Desmond et al. . |
| 5,232,130 | 8/1993 | Woodard . |
| 5,361,937 | 11/1994 | Wiese . |
| 5,372,301 | 12/1994 | Besson . |
| 5,556,004 | 9/1996 | Brucker . |
| 5,667,106 | 9/1997 | Robbins, III . |
| 5,791,528 | 8/1998 | Robbins, III et al. . |

*Primary Examiner*—Philippe Derakshani
*Attorney, Agent, or Firm*—J. R. McDaniel; R. L. Schmalz

[57] ABSTRACT

This invention relates to packages which are designed to dispense a pre-determined amount of product. Such structures of this type, generally, include a series of internal folds that allow a pre-determined amount of product to be loaded into the dispensing chamber. This pre-determined amount is then dispersed from the dispensing chamber by the end-user until the chamber is empty.

15 Claims, 8 Drawing Sheets

INTEGRATED MEASURING SYSTEM PACKAGE

BACKGROUND OF THE INVENTION

1. Field of the Invention

This invention relates to packages which are designed to dispense a pre-determined amount of product. Such structures of this type, generally, include a series of internal folds that allow a pre-determined amount of product to be loaded into the dispensing chamber. This pre-determined amount is then dispersed from the dispensing chamber by the end-user until the chamber is empty.

2. Description of the Related Art

It is a common practice in industries where a granular type of product must be dispensed to require the consumer to use some form of a measuring devise, such as a measuring cup or scoop. However, these scoops are often covered with product when they are removed from the package, thereby making for a mess. Also, these scoops add a second feature that consumers have to use to dispense the product. Also, these scoops often get lost or misplaced, which adds difficulty to the package. Finally, if a measuring cup is required, the individual using the product must locate the item and clean it out after use.

It is also known in a packaging art to employ a package which loads the pre-determined amount of product. Exemplary of such prior art is U.S. Pat. No. 4,564,125 ('125) to J. J. Esslinger, entitled "BB Loader". The '125 reference employs the use of a trough so that a pre-determined quantity of BBs can be quickly loaded into the trough from the reservoir in the housing. However, the trough cannot be used for granular materials because the trough is too small and would easily clog with granular materials, such as detergent products. Therefore, a more advantageous system, then, would be presented if the package were able to handle a variety of materials, including granular products.

It is apparent from the above that there exists a need in the art for a package which is lightweight through simplicity of parts and the uniqueness of structure, and which at least equals the loading characteristics of the known prior art, but which at the same time can be used in conjunction with a variety of materials. It is the purpose of this invention to fulfill this and other needs in the art in a manner more apparent to the skilled artisan once given the following disclosure.

SUMMARY OF THE INVENTION

Generally speaking, this invention fulfills these needs by providing an integrated measuring system package, comprising a housing having an upper end and a lower end and a plurality of paperboard side panels hingedly connected to each other and further having a paperboard reservoir of a pre-determined size and a longitudinal, paperboard chute located substantially between the upper and lower ends and rigidly attached to one of the side panels of the housing, wherein the reservoir is located substantially adjacent to the lower end and extends toward the upper end and further includes a plurality of paperboard panels hingedly connected to each other and an extension panel which extends above the panels of the reservoir for a pre-determined distance, and the chute includes a plurality of paperboard panels hingedly connected to each other and having a first and second end such that the first end of the chute is located substantially adjacent to the upper end and the second end of the chute is located a pre-determined distance away from the reservoir and the panel extension.

In certain preferred embodiments, the upper end includes a tear out section which allows the pre-determined amount of material to be poured out of the package. Also, the upper end includes a reclose feature.

In another further preferred embodiment, the integrated measuring system package solves the problem of measuring a certain amount of product by incorporating an integrated measuring system internally into the package. The measuring system allows for dispensing of a pre-determined amount of product. This built-in simplicity eliminates the need for the consumer to worry about cleaning, finding or storing the measuring equipment.

The preferred package, according to this invention, offers the following advantages: lightness in weight; ease of assembly; excellent stability; excellent durability; ease of measurement; excellent accuracy of measurement; and excellent economy. In fact, in many of the preferred embodiments, these factors of ease of measurement, accuracy of measurement and economy are optimized to an extent that is considerably higher than heretofore achieved in prior, known packages.

The above and other features of the present invention, which will become more apparent as the description proceeds, are best understood by considering the following detailed description in conjunction with the accompanying drawings, wherein like characters represent like parts throughout the several views and in which:

DETAILED DESCRIPTION OF THE INVENTION

Figure 1:
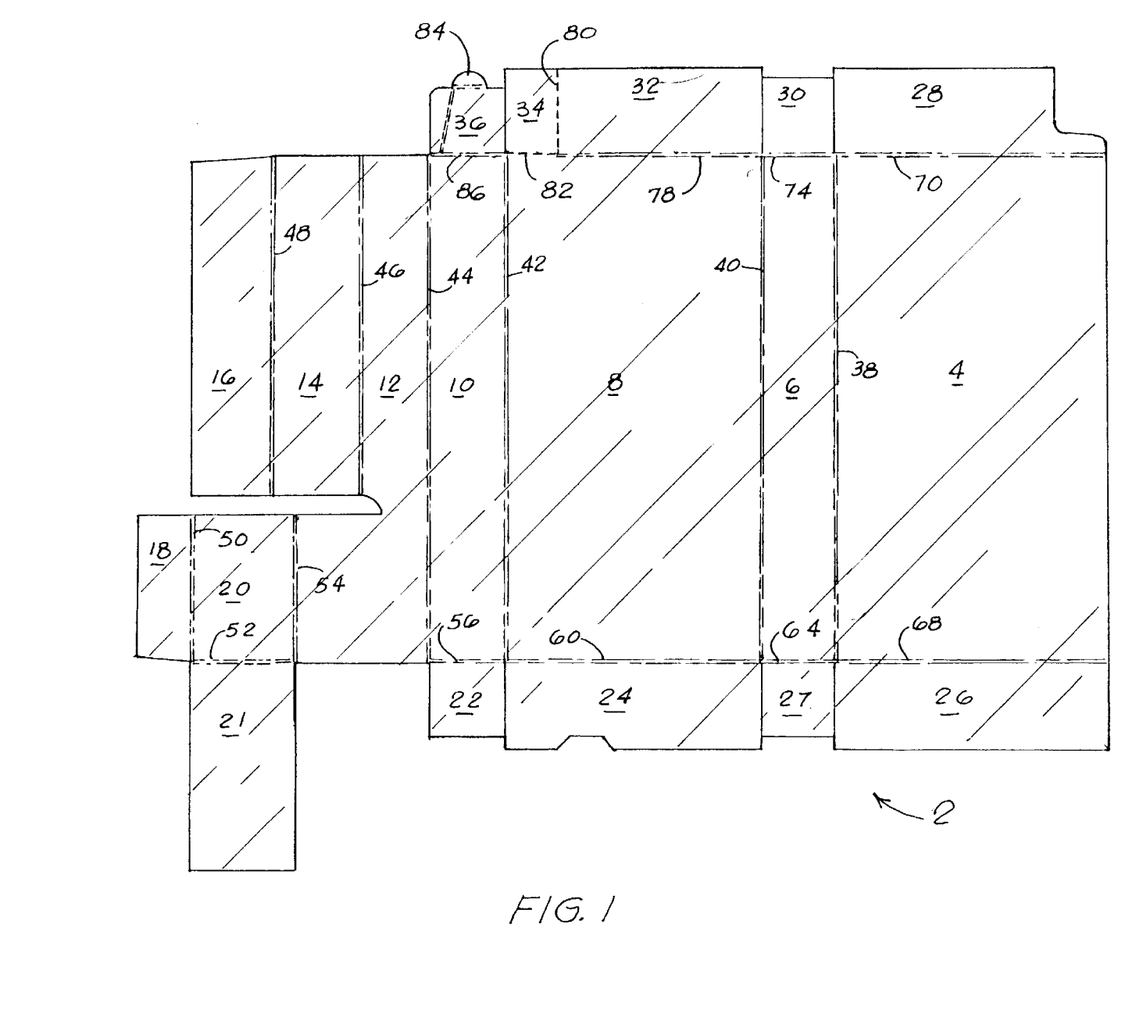
FIG. 1 is a side plan view of a paperboard blank for an integrated measuring system package, according to the present invention.

With reference first to FIG. 1, there is illustrated an advantageous environment for use of the concepts of this invention. In particular, paperboard blank 2 is illustrated. Blank 2, typically, is constructed from a 0.018" thick solid bleached sulfate (SBS) sheet. Definitely, the term paperboard describes paper within the thickness range of 0.007 to 0.030". The invention is relative to the full scope of such a range, as applied to packaging and beyond.

When used for food carton stock, paperboard is usually clay coated on at least one side surface and frequently on both sides. The paperboard trade characterizes a paperboard web or sheet that has been coated on one side as C1S and C2S for a sheet coated on both sides. Compositionally, this paperboard coating is a fluidized blend of minerals such as coating clay, calcium carbonate, and/or titanium dioxide with starch or an adhesive which is smoothly applied to a traveling web surface. Successive densification and polishing by calendering finishes the mineral coated surface to a high degree of smoothness and a superior graphics print surface.

When C1S paperboard is used for food packaging, the clay coated surface is prepared as the outside surface, i.e., the surface not in contact with the food. Pursuant to the present invention, the other side (the side in contact with the food) is conventionally coated with a food-grade polymeric coating. The polymeric coating process may include a gravure roll, flexocoater, a rod coater, an air knife or a screen blade.

Blank 2 includes, in part, side panels 4, 6, 8, 10, 12, 14, and 20. End panel 22 is hingedly attached to side panel 10 by conventional score line 56. End panel 24 is hingedly attached to side panel 8 by conventional score line 60. End panel 26 is hingedly attached to side panel 4 by conventional score line 68. End panel 27 is hingedly attached to side panel 6 by conventional score line 64. End panel 28 is hingedly attached to side panel 4 by conventional score line 70. End panel 30 is hingedly attached to side panel 6 by conventional score line 74. End panel 32 is hingedly attached to side panel 8 by conventional score line 78. End panel 32 also includes opening feature 34 which includes perforated lines 80 and 82 to allow opening feature 34 to be removed from end panel 32. Reclose flap 36, which includes extension 84, is hingedly attached to end panel 10 by conventional score line 86.

Panel 4 is hingedly connected to panel 6 by conventional score line 38. Panel 6 is hingedly connected to panel 8 by conventional score line 40. Panel 8 is hingedly connected to panel 10 by conventional score line 42. Panel 10 is hingedly connected to panel 12 by conventional score line 44. Panel 12 is hingedly connected to panel 14 by conventional score line 46. Panel 12 is hingedly connected to panel 20 by conventional score line 54. Panel 14 is hingedly connected to end panel 16 by conventional score line 48. Panel 20 is hingedly connected to extension panel 21 by conventional score line 52. Panel 20 is hingedly connected to end panel 18 by conventional score line 50.

Figure 2:
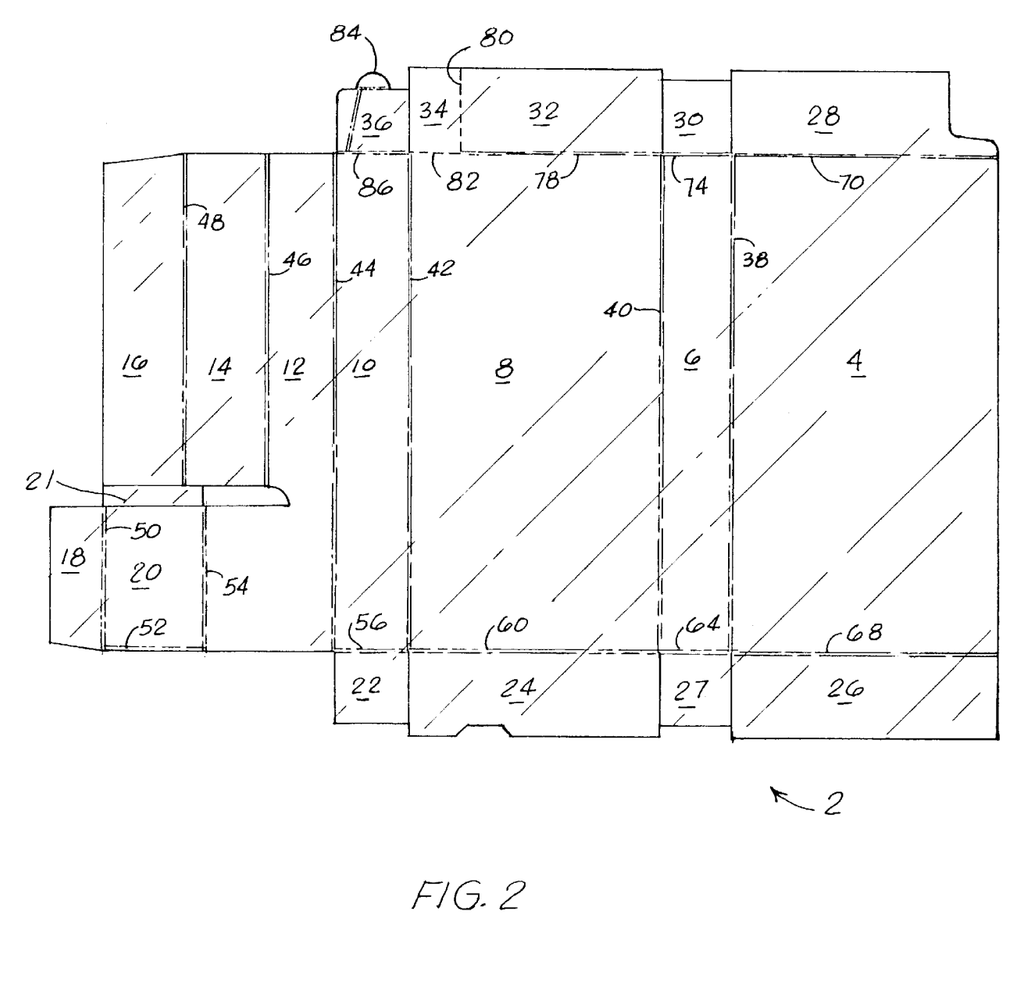
FIG. 2 is a side plan view of the blank with the reservoir panel extension constructed.

As shown in FIG. 2, extension panel 21 is folded along score line 52 and rigidly attached to side panel 20 by conventional techniques.

Figure 3:
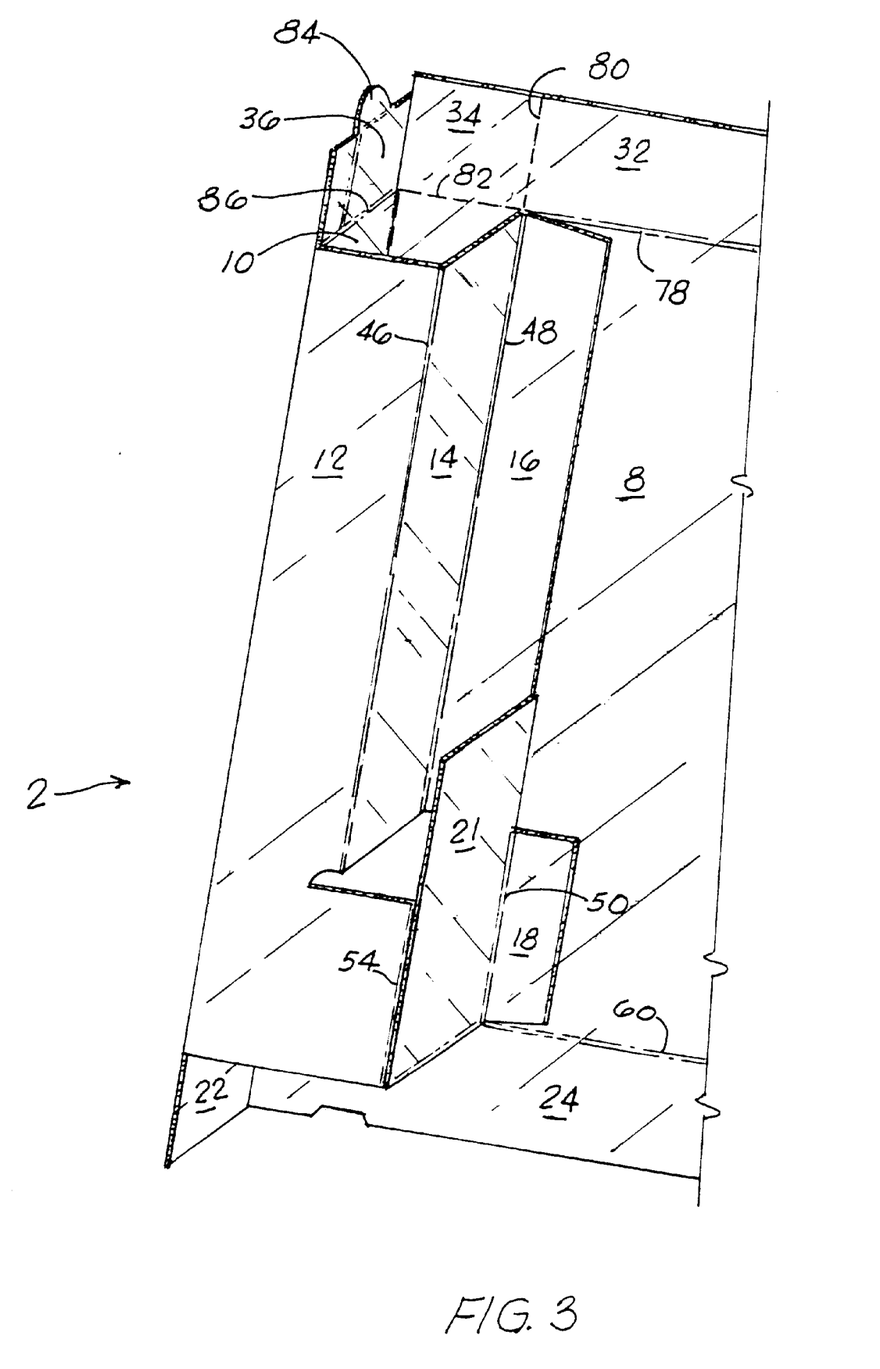
FIG. 3 is an isometric view of the reservoir and chute constructed and attached to a side panel, according to the present invention.

As shown in FIG. 3, panels 10, 12, 14 and end panel 16 are folded and end panel 16 is rigidly attached to side panel 8 by conventional techniques. This folding of panels 12, 14 and end panel 16 creates a chute. Also, as shown in FIG. 3, panels 10, 12, 21 and end panel 18 are folded and end panel 18 is rigidly attached to panel 8 by conventional techniques. This folding of panels 12, end panels 18 and 20 and their securing to panel 8 creates a reservoir.

Figure 4:
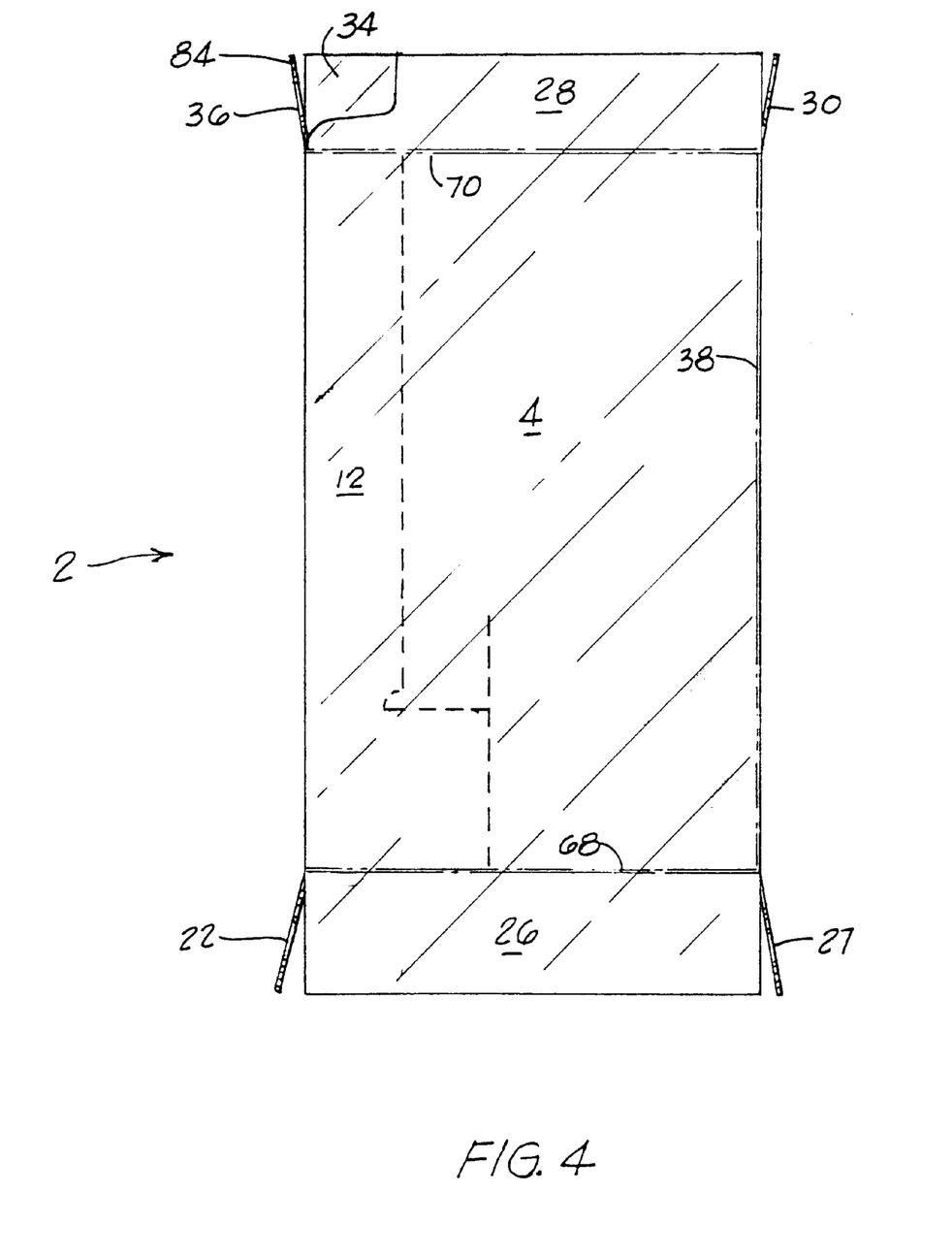
FIG. 4 is a side plan view showing the attachment of the side panel to the chute and reservoir, according to the present invention.

As shown in FIG. 4, panels 4 and 6 are folded such that panel 4 is conventionally attached to side panel 12.

Figure 5:
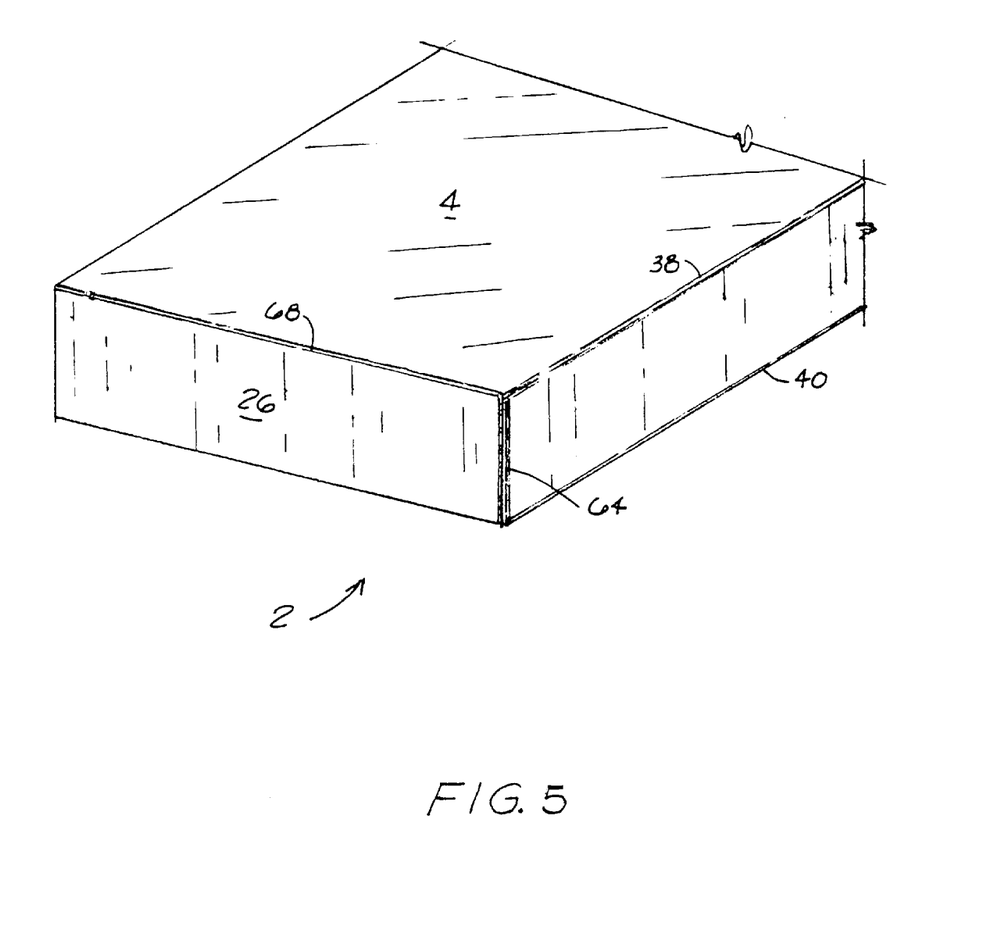
FIG. 5 is an end view of the sealed bottom end of the package, according to the present invention.

As shown in FIG. 5, panels 22, 24, 26 and 27 are conventionally folded and sealed in order to create integrated measuring system package 100.

Figure 6:
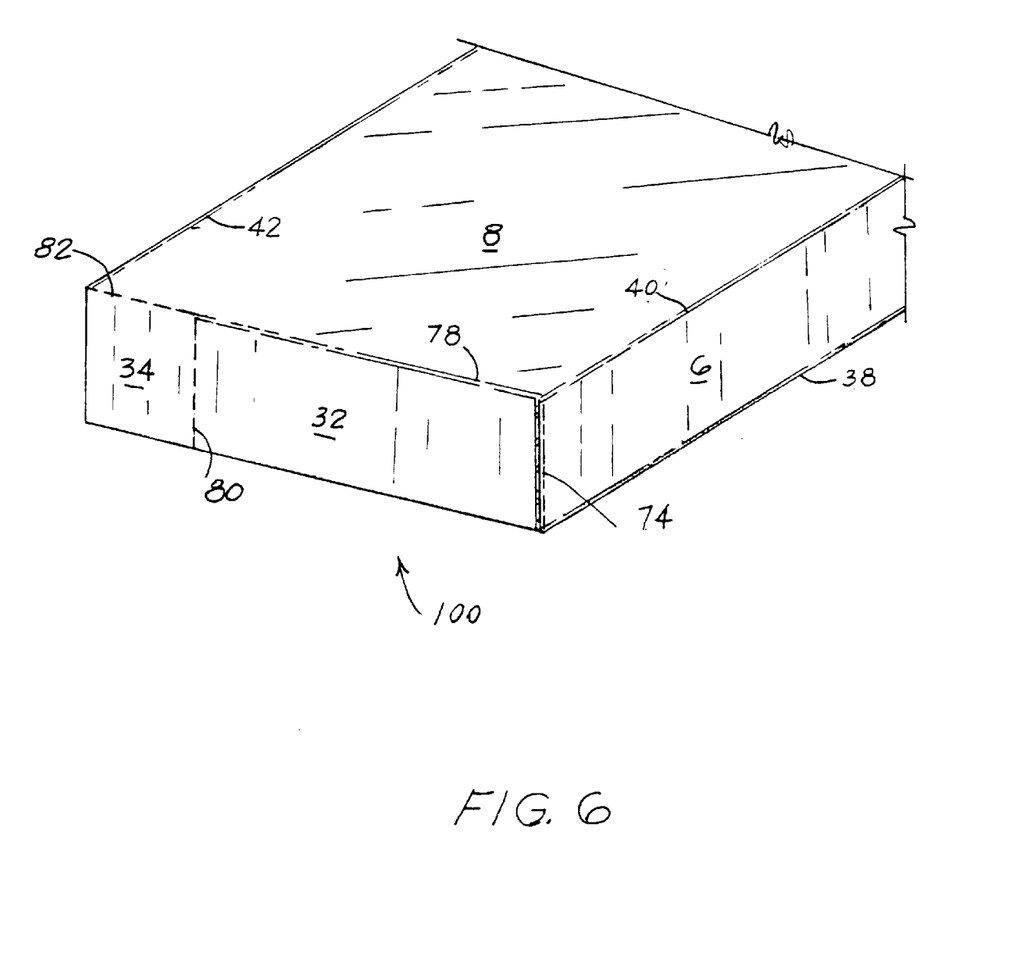
FIG. 6 is a top view of the sealed upper end of the package, according to the present invention.

As shown in FIG. 6, panels 28, 30, 32, and 36 are folded and conventionally sealed. As can be seen in FIG. 5, opening feature 34 is located on top and towards one side.

Figure 7:
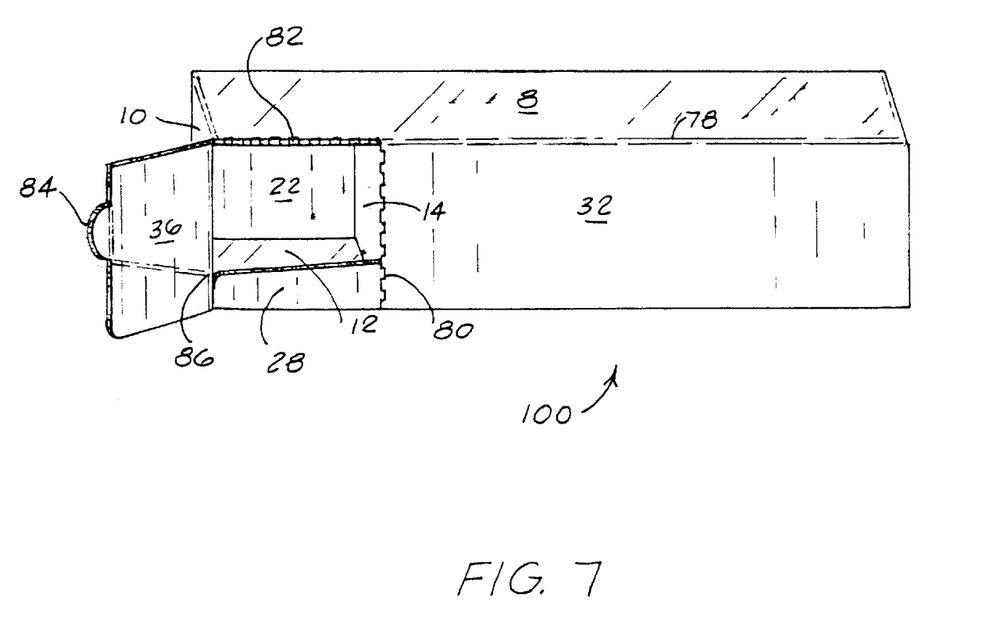
FIG. 7 is a top view of a portion of the sealed upper end being removed so that contents can be poured from the package, according to the present invention.

Once the desired contents to be measured and dispensed are placed within package 100 and, ultimately purchased by the consumer, the consumer merely has to remove opening feature 34 along perforations 80 and 82, as shown in FIG. 7.

A pre-determined amount of material to be dispensed is located in the reservoir of FIG. 3. The consumer merely has to tilt the package 100 such that all of the material runs along the chute of FIG. 3 and out the end of package 100.

Figure 8:
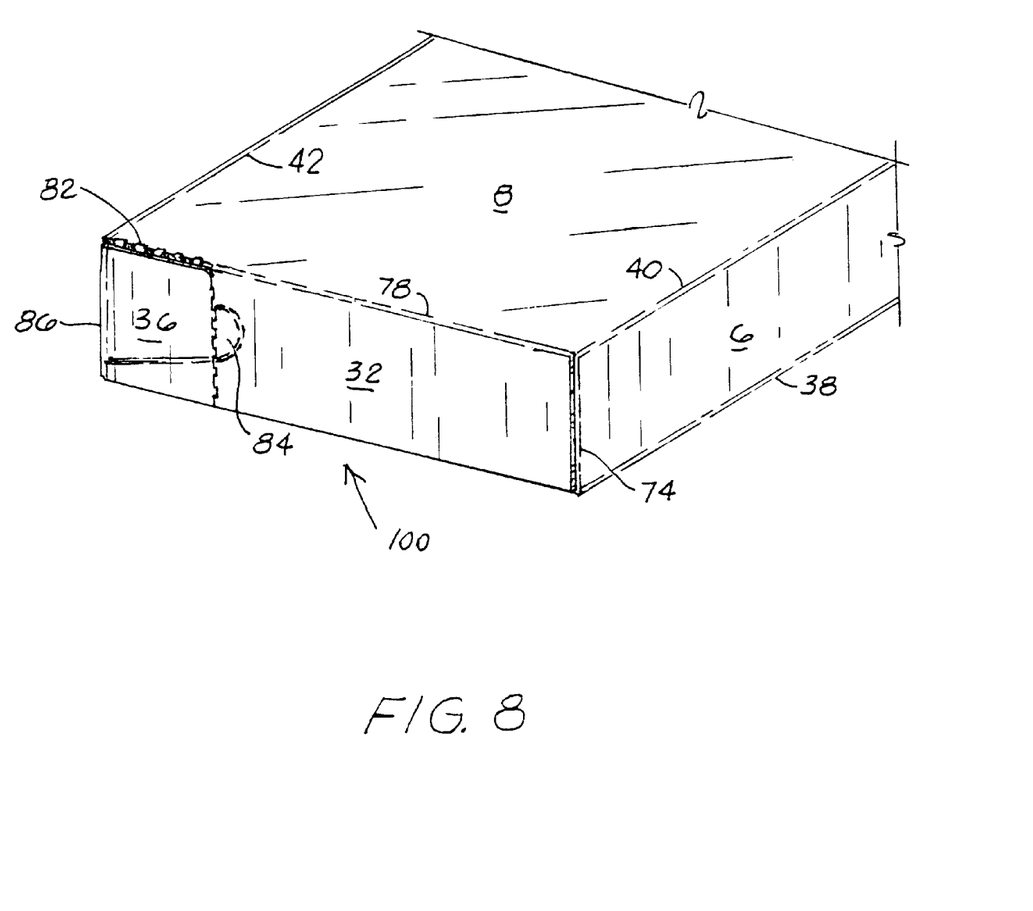
FIG. 8 is a top view of the reclose feature of the package, according to the present invention.

After the pre-determined amount of the material has been dispensed, package 100 is then set back upright and the consumer can fold over reclose feature 36 such that extension 84 is slid under side panel 32, as shown in FIG. 8.

With respect to the reservoir and chute of FIG. 3, the reservoir and chute are configured in the manner such that a pre-determined amount of product can be dispensed. As shown in FIG. 3, the key function of this chute is that it only goes a portion of the way down package 100, leaving a gap or space near the bottom of package 100. Another key function of the reservoir is that it is located behind the chute at a pre-determined distance. In addition, the reservoir extends upward past the ending point of the chute. By extending the reservoir past the ending point of the chute for a portion of the chute, this allows the product to fill the reservoir chamber when package 100 is upright. When package 100 is tilted 90°, extension 21 of the reservoir causes the product to cease filling the reservoir. Without extension 21, the product could fill the reservoir and then as package 100 is tilted to 90°, the product would slowly begin to stop, as compared to the obvious stop through the use of extension 21.

Once given the above disclosure, many other features, modifications or improvements will become apparent to the skilled artisan. Such features, modifications or improvements are therefore, considered to be a part of this invention, the scope of which is to be determined by the following claims.

What is claimed is:

1. An integrated measuring system package, wherein said package is comprised of:

a housing having an upper end and a lower end and a plurality of paperboard side panels hingedly connected to each other and further having a paperboard reservoir of a pre-determined size and a longitudinal, paperboard chute located substantially between said upper and lower ends and rigidly attached to one of said side panels of said housing, wherein said reservoir is located substantially adjacent to said lower end and extends toward said upper end and further includes a plurality of paperboard panels hingedly connected to each other and an extension panel which extends above said panels of said reservoir for a pre-determined distance; and said chute includes a plurality of paperboard panels hingedly connected to each other and having a first and second end such that said first end of said chute is located substantially adjacent to said upper end and said second end of said chute is located a pre-determined distance away from said reservoir and said panel extension.

2. The package, as in claim 1, wherein said upper end is further comprised of:

an opening feature located along one end of said upper end.

3. The package, as in claim 2, wherein said opening feature is further comprised of:

a perforated area.

4. The package, as in claim 1, wherein said package is further comprised of:

a reclose feature.

5. The package, as in claim 4, wherein said reclose feature is further comprised of:

a flap means hingedly attached at one end to said one of said plurality of side panels; and an extension means located at said other end of said flap means.

6. An integrated measuring system paperboard blank, wherein said blank is comprised of:

a plurality of side wall panels hingedly connected to each other;

top end panels hingedly connected to said plurality of side wall panels;

bottom end panels hingedly connected to said plurality of side wall panels;

a chute means located substantially adjacent to said top end panels and hingedly connected to one of said plurality of side wall panels such that said chute means includes a plurality of hingedly connected panels; and a reservoir means located substantially adjacent to said bottom end panels and hingedly connected to said one of said plurality of side wall panels such that said reservoir means includes a plurality of hingedly connected panels and a extension panel hingedly connected to one of said plurality of said reservoir means panels and wherein said reservoir means is located a predetermined distance away from said chute means.

7. The blank, as in claim 6, wherein said top end panels are further comprised of:

an opening feature located along one end of said top end panels.

8. The blank, as in claim 7, wherein said opening feature is further comprised of:

a perforated area.

9. The blank, as in claim 6, wherein said blank is further comprised of:

a reclose feature.

10. The blank, as in claim 9, wherein said reclose feature is further comprised of:

a flap means hingedly attached at one end to said one of said plurality of side panels; and an extension means located at said other end of said flap means.

11. A method of constructing an integrated paperboard measuring system including a blank which is comprised of a plurality of side wall panels hingedly connected to each other, top end panels hingedly connected to said plurality of side wall panels, bottom end panels hingedly connected to said plurality of side wall panels, a chute means located substantially adjacent to said top end panels and hingedly connected to one of said plurality of side wall panels such that said chute means includes a plurality of hingedly connected panels, and a reservoir means located substantially adjacent to said bottom end panels and hingedly connected to said one of said plurality of side wall panels such that said reservoir means includes a plurality of hingedly connected panels and a extension panel hingedly connected to one of said plurality of said reservoir means panels and wherein said reservoir means is located a predetermined distance away from said chute means, wherein said method is comprised of the steps of:

attaching said extension panel to one of said plurality of said reservoir means panels;

folding said chute means;

attaching said chute means to one of said plurality of said side wall panels;

folding said reservoir means;

attaching said reservoir means to said one of said plurality of said side wall panels;

folding said side wall panels;

attaching a second of said side wall panels to said chute means and said reservoir means;

folding said bottom end panels;

attaching said bottom end panels;

folding said top end panels; and attaching said top end panels to create said integrated paperboard measuring system.

12. The method, as in claim 11, wherein said top end panels are further comprised of:

an opening feature located along one end of said top end panels.

13. The method, as in claim 12, wherein said opening feature is further comprised of:

a perforated area.

14. The method, as in claim 11, wherein said blank is further comprised of:

a reclose feature.

15. The method, as in claim 14, wherein said reclose feature is further comprised of:

a flap means hingedly attached at one end to said one of said plurality of side panels; and an extension means located at the other end of said flap means.

* * * * *